Sept. 5, 1939.  E. L. SCHICK  2,172,111
APPARATUS FOR MOLDING PLASTIC MATERIAL
Filed April 30, 1936
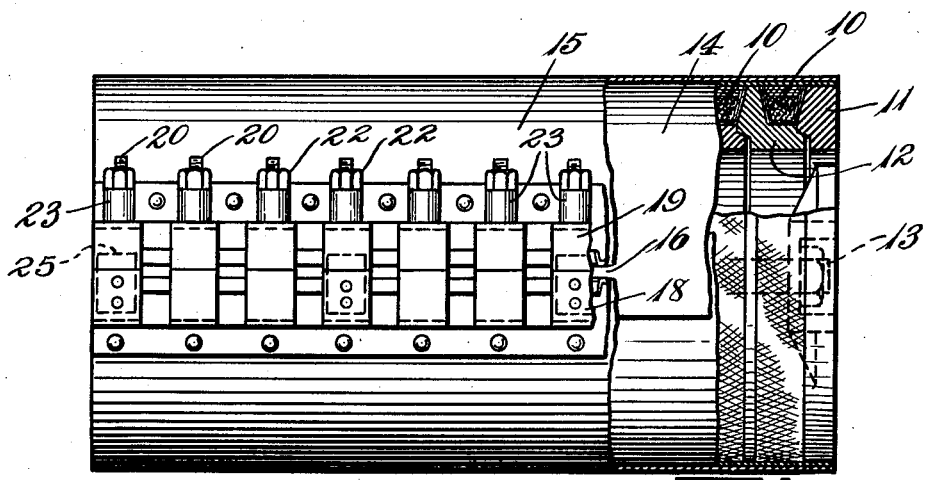
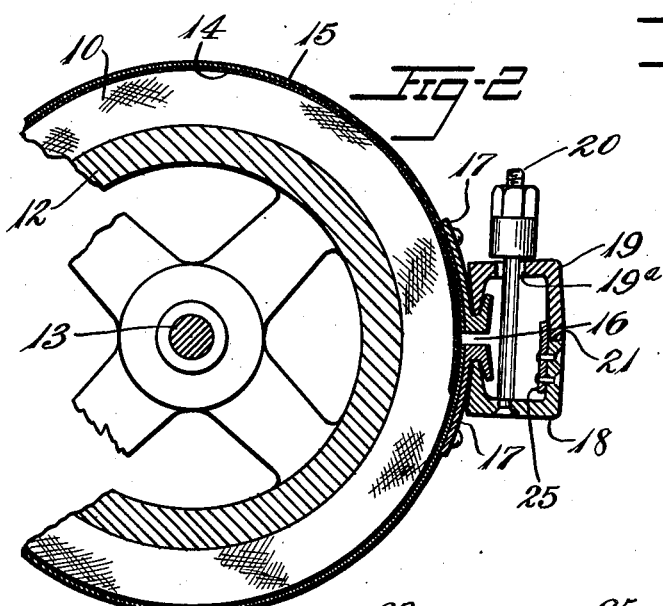
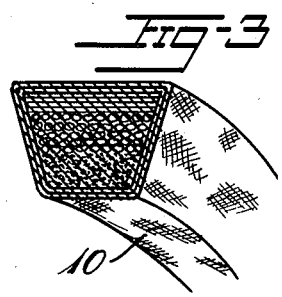
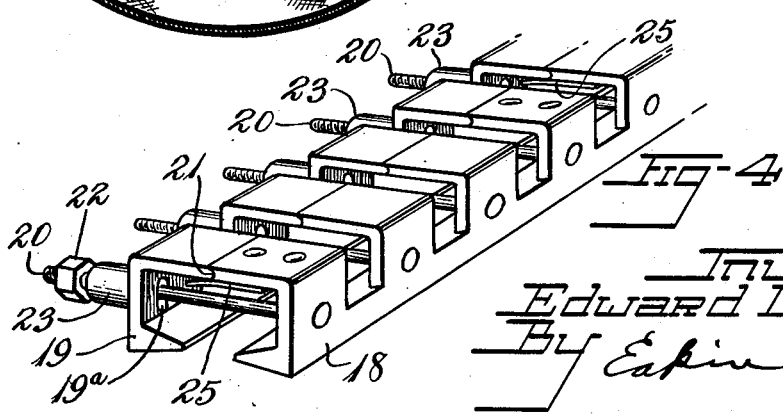
Inventor
Edward L. Schick
By Eakin & Avery
Attys.

Patented Sept. 5, 1939

2,172,111

UNITED STATES PATENT OFFICE 2,172,111

APPARATUS FOR MOLDING PLASTIC MATERIAL

Edward L. Schick, Cuyahoga Falls, Ohio, assignor to The B. F. Goodrich Company, New York, N. Y., a corporation of New York Application April 30, 1936, Serial No. 77,179

6 Claims. (Cl. 18—34)

This invention relates to apparatus for molding plastic material and is especially useful in the molding of endless transmission belts or other annular articles.

In the manufacture of endless transmission belts of the side-driving type it is customary to confine the fabricated belts in grooves formed between interfitting mold sections of annular form. The grooves for receiving the belts are open at the peripheries of the mold sections and to provide for confining the belts in the grooves, a sleeve of metal is clamped about the assembly of mold sections and the articles in the grooves. This has not been entirely satisfactory where the clamping has been effected by bolts through flanges at the sleeve edges because of the bowing of the sleeve edges resulting from the clamping pressure, which has caused defectively molded articles. The difficulty is especially pronounced in the molding of endless transmission belts which require among their important characteristics that they be uniform in quality throughout their length and not locally lumpy or otherwise deformed.

The principal object of the present invention is to provide uniform pressure about the peripheries of the articles.

Other objects will appear from the following description and the accompanying drawing.

Of the drawing:

Fig. 1 is a side elevation, partly broken away and partly in section, showing the mold assembly, the confined articles, and the clamping means in its preferred form.

Fig. 2 is an end elevation of the same, partly broken away, and partly in section, the end mold ring 11 having been removed.

Fig. 3 is a perspective view of a section of a finished transmission belt of the side driving type.

Fig. 4 is a perspective view of the clamping members in the preferred form.

Referring to the drawing, the annular belts are designated by the numeral 10, and are assembled in the open grooves formed between mold rings 11, 12 which are held together by the bolt 13. A sheet of metal 14 is wrapped around the assembly with its ends overlapping so as completely to confine the articles in their grooves and present a smooth molding surface.

The clamping sleeve 15 is applied thereover. It is split along one side as at 16 and its margins are reinforced by channels 17 fixed thereto. The clamp comprises two channel shaped members 18, 19 and bolts 20 for drawing them together. The channel 18 has a concave groove 21 in the edge of one leg thereof and the channel 19 has its corresponding leg rounded at its edge to rotatably engage therein. The remaining legs of the channels 18, 19 are adapted to engage the grooves of channels 17, the arrangement being such that clamp members 18, 19 are substantially hinged to rock upon each other with their impinged legs adapted to tighten the sleeve 15 during such rocking movement. Bolts 20 are fixed to clamp member 18 and pass through clearance slots 19ª in clamp member 19. Nuts 22 and spacing collars 23 are provided to tighten the clamping member. A keeper 25, preferably of spring metal, may be fixed to clamp channel 18 to assist in holding the clamp channels in alignment.

It is found that this arrangement provides for substantially uniform pressure throughout the circumference of the assembly, without objectionable indentation of the backs of the belts by the terminal margins of the inner metal band 14, such as results from drawing together lugs of substantial height mounted near the ends of a single split cover sleeve, and, conversely, without excessively low pressure upon and consequent bulging of the belt material in that region such as occurs when tangential tightening forces are applied to a split cover sleeve at considerable distances from the split.

It will be observed that in this assembly forces that continue to be substantially tangential are applied at such short distances from the belt material that the moment arms for tilting the channel members 17 inward are very small, and that such small tilting force as is present is adequately resisted by the double thickness of metal of considerable area which is afforded by the overlaps of the ends of the split sleeve 14.

I claim:

1. Clamping apparatus comprising a band, a pair of clamp members fulcrumed upon each other at a position radially remote from the band and each having rocking engagement with an end of the band, and means engaging the clamp members between their fulcrum and the band for drawing the members toward each other.

2. Clamping apparatus comprising a band, a pair of bearing plates on the ends of the band, a pair of clamp members each bearing upon one of the bearing plates and fulcrumed upon each other at a position remote therefrom, and means engaging the clamp members between their common fulcrum position and their band-bearing positions for drawing the ends of the band toward each other.

3. Apparatus for molding a plastic article of annular form, said apparatus comprising a mold assembly having a circumferential groove for containing the article with the article projecting radially beyond the side walls of the groove, an axially split flexible band for confining the article in said groove, terminal shoulders at the axially disposed margins of the band, and means engaging the shoulders of the band to draw the margins toward each other by forces that are so nearly tangential and are applied at positions so close to each other and to the article that the forces effect substantially no bending strain in the band, said means comprising a pair of clamp members engaging the terminal shoulders of the band and hinged to each other at a fulcrum remote from the band, and draw means for moving the clamp members toward each other about said fulcrum, said draw means being disposed entirely radially outward of the positions of engagement of the clamp member with the terminal shoulders of the band.

4. Apparatus as defined in claim 3 in which the clamp members are of channel form with one leg of one channel fulcrumed upon a leg of the other.

5. Clamping apparatus comprising a band adapted to enclose an object, an element at each end of the band, each element having a notch located closely adjacent both the band and the notch in the other element, a pair of clamp members fulcrumed upon each other at a position remote from the notches and having bearing portions engaging in said notches, and means engaging the clamp members radially outward of said notches for urging the clamp members toward each other to tighten the band about the object so that by virtue of the close location of said notches to each other and the band the tightening is effected by forces that are applied so nearly tangential and so close to each other and to the object that the forces effect substantially no bending strains in the band.

6. A clamping apparatus comprising a band adapted to enclose an object, an element at each end of the band, a pair of clamp members fulcrumed to each other at a position remote from said elements, the clamp member and said elements having cooperating localized bearing portions each located closely adjacent the object and the other bearing portion, and draw means engaging the clamp members radially outward of said bearing portions for urging the clamp members toward each other to tighten the band so that by virtue of the close location of the bearing portions to each other and to the object the clamping forces are applied so nearly tangential to the object that the forces effect substantially no bending forces in the band.

EDWARD L. SCHICK.